(12) United States Patent
Shoda et al.

(10) Patent No.: US 9,680,407 B2
(45) Date of Patent: Jun. 13, 2017

(54) ELECTRIC MOTOR CONTROL DEVICE

(71) Applicant: Mitsubishi Electric Corporation, Tokyo (JP)

(72) Inventors: Tomohisa Shoda, Tokyo (JP); Yasufumi Ogawa, Tokyo (JP); Yoshimasa Nishijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/109,473

(22) PCT Filed: May 20, 2014

(86) PCT No.: PCT/JP2014/063341
§ 371 (c)(1),
(2) Date: Jul. 1, 2016

(87) PCT Pub. No.: WO2015/177863
PCT Pub. Date: Nov. 26, 2015

(65) Prior Publication Data
US 2016/0329856 A1    Nov. 10, 2016

(51) Int. Cl.
*G05B 5/00* (2006.01)
*H02P 1/30* (2006.01)
*H02P 29/68* (2016.01)
*H02P 6/06* (2006.01)
*H02K 11/21* (2016.01)
*H02K 11/26* (2016.01)
*H02K 11/27* (2016.01)
(Continued)

(52) U.S. Cl.
CPC .............. *H02P 29/68* (2016.02); *H02K 11/21* (2016.01); *H02K 11/26* (2016.01); *H02K 11/27* (2016.01); *H02P 6/00* (2013.01); *H02P 6/06* (2013.01); *H02P 27/08* (2013.01); *H02P 27/085* (2013.01); *H02P 23/00* (2013.01)

(58) Field of Classification Search
None
See application file for complete search history.

(56) References Cited

U.S. PATENT DOCUMENTS

2013/0193897 A1 * 8/2013 Iwashita .............. H02P 27/085
318/503

FOREIGN PATENT DOCUMENTS

| JP | 2006-174659 A | 6/2006 |
|----|---------------|--------|
| JP | 2009-106106 A | 5/2009 |
| JP | 2011-109803 A | 6/2011 |

OTHER PUBLICATIONS

International Search Report for PCT/JP2014/063341 dated Jul. 1, 2014.

* cited by examiner

*Primary Examiner* — Bentsu Ro
*Assistant Examiner* — Zemenay Truneh
(74) *Attorney, Agent, or Firm* — Sughrue Mion, PLLC; Richard C. Turner

(57) ABSTRACT

An electric motor control device drives a power converter (30) by two-phase modulation drive based on calculation of a driving method setting and element loss calculation section (16) when an electric motor (4) is equal to or less than a predetermined rotational speed; and switches switching signals from a switching signal generation section (14) to switch a switching operation of the switching elements when a loss integrated value of a first switching element with a large switching loss or a second switching element exceeds a predetermined value.

3 Claims, 12 Drawing Sheets

(51) Int. Cl.
  *H02P 27/08* (2006.01)
  *H02P 6/00* (2016.01)
  *H02P 23/00* (2016.01)

FIG. 11

| First electrical angle range | θ1≦θ<θ2 | | | θ2≦θ<θ3 | | | θ3≦θ<θ4 | | |
|---|---|---|---|---|---|---|---|---|---|
| Second electrical angle range | — | θ≦θ2/2 | Other than left description | — | θ≦θ3/2 | Other than left description | — | θ≦θ4/2 | Other than left description |
| Control state | Normal | After switching | After switching | Normal | After switching | After switching | Normal | After switching | After switching |
| Element 3Q1 | Operation 1 | No switching | Normally ON | Normally ON | Operation 2 | Operation 4 | Operation 1 | Normally ON | No switching |
| 3Q2 | Operation 2 | No switching | Normally OFF | Normally OFF | Operation 1 | Operation 3 | Operation 2 | Normally OFF | No switching |
| 3Q3 | Normally OFF | Operation 4 | Operation 2 | Operation 1 | Normally OFF | No switching | Operation 3 | No switching | Normally ON |
| 3Q4 | Normally ON | Operation 3 | Operation 1 | Operation 2 | Normally ON | No switching | Operation 4 | No switching | Normally OFF |
| 3Q5 | Operation 3 | Normally ON | No switching | Operation 3 | No switching | Normally OFF | Normally OFF | Operation 2 | Operation 4 |
| 3Q6 | Operation 4 | Normally OFF | No switching | Operation 4 | No switching | Normally ON | Normally ON | Operation 1 | Operation 3 |

| First electrical angle range | θ4≦θ<θ5 | | | θ5≦θ<θ6 | | | θ6≦θ<θ7 | | |
|---|---|---|---|---|---|---|---|---|---|
| Second electrical angle range | — | θ≦θ5/2 | Other than left description | — | θ≦θ6/2 | Other than left description | — | θ≦θ7/2 | Other than left description |
| Control state | Normal | After switching | After switching | Normal | After switching | After switching | Normal | After switching | After switching |
| Element 3Q1 | Operation 1 | No switching | Normally OFF | Normally OFF | Operation 2 | Operation 4 | Operation 1 | Normally OFF | No switching |
| 3Q2 | Operation 2 | No switching | Normally ON | Normally ON | Operation 1 | Operation 3 | Operation 2 | Normally ON | No switching |
| 3Q3 | Normally ON | Operation 4 | Operation 2 | Operation 1 | Normally ON | No switching | Operation 3 | No switching | Normally OFF |
| 3Q4 | Normally OFF | Operation 3 | Operation 1 | Operation 2 | Normally OFF | No switching | Operation 4 | No switching | Normally ON |
| 3Q5 | Operation 3 | Normally OFF | No switching | Operation 3 | No switching | Normally ON | Normally ON | Operation 2 | Operation 4 |
| 3Q6 | Operation 4 | Normally ON | No switching | Operation 4 | No switching | Normally OFF | Normally OFF | Operation 1 | Operation 3 |

ELECTRIC MOTOR CONTROL DEVICE

CROSS REFERENCE TO RELATED APPLICATIONS

This application is a National Stage of International Application No. PCT/JP2014/063341 filed May 20, 2014, the contents of which are incorporated herein by reference in their entirety.

TECHNICAL FIELD

The present invention relates to electric motor control devices and, more particularly, relates to an electric motor control device which changes a driving method of a power converter according to an operation state of an electric motor.

BACKGROUND ART

In recent years, with the aim of reducing the amount of carbon dioxide emissions and improving fuel consumption, there has become widespread vehicle mounted with an electric motor and an internal combustion engine, that is, a hybrid vehicle and/or an electric car which is mounted with only an electric motor and drives by the driving force of the electric motor. In these vehicles mounted with the electric motors, there are mounted with a charging device which outputs direct current (DC) power, a power converter (inverter) which converts the DC power from the charging device into alternating current (AC) power and supplies the power to the electric motor, and the like, in addition to the electric motor.

The power converter which supplies the power to the electric motor converts the DC power into the AC power three-phase modulation drive pulse width modulation (PWM) control that uses switching elements such as insulated gate bipolar transistors (IGBTs).

Here, three-phase modulation drive and two-phase modulation drive of the power converter for use in such an electric motor control device will be described.

FIG. 13 is a chart showing the relation between a phase voltage command and a switching signal during three-phase modulation drive and during two-phase modulation drive. In the case of generating a line voltage (A) and a motor current (B) shown in FIG. 13, a phase voltage is shown like (C) and an upper switching signal is shown like (D) in a driving method by the three-phase modulation; and a phase voltage is shown like (E) and an upper switching signal is shown like (F) in a driving method by the two-phase modulation. Incidentally, a triangular wave cycle (carrier frequency) is set to the same cycle.

As can be seen from FIG. 13, it shows that a switching operation is normally performed during the three-phase modulation drive, whereas there exist a switching signal that becomes normally ON (or normally OFF) and switching operation is small during the two-phase modulation drive.

There exist a loss at the time of start-up, an ON loss, and a loss at the time of start-up/stop in the switching operation of the switching elements. Accordingly, the switching operation is small means that a loss generated by power conversion from DC power to AC power is small.

However, the power conversion from the DC power to the AC power is the switching operation at high frequency and high power; and accordingly, the switching element generates heat by a loss (switching loss) generated by the switching operation and the temperature of the switching element rises. Then, when the switching element reaches its upper limit temperature, supply power to the electric motor is reduced is order to avoid a breakdown of the switching element and, more specifically, the number of switching is reduced and it becomes difficult to supply desired power, which is for generating driving force corresponding to a driver's operation, to the electric motor.

As a section of preventing a deterioration of supply power caused by such a temperature rise of the switching element, that is, an output deterioration of the electric motor, there is a technique disclosed in Patent Document 1.

PRIOR ART DOCUMENT

Patent Document

Patent Document 1: Japanese Unexamined Patent Publication No. 2011-109803

SUMMARY OF INVENTION

Problems to be Solved by the Invention

Patent Document 1 discloses a technique which detects the temperature of an inverter, switches PWM control that is a driving method of the inverter from three-phase modulation to two-phase modulation according to its detection temperature, and further changes a frequency of a carrier signal. However, in a conventional device disclosed in Patent Document 1, problems exist in that a temperature sensor which is for detecting the temperature of the inverter is needed to cause cost-up, there is a possibility that an electromagnetic sound due to a switching operation becomes large to cause a noise by changing the carrier signal, and the like.

The present invention has been made to solve the foregoing problem, and an object of the present invention is to provide an electric motor control device which suppresses cost-up and the generation of a noise, reduces a loss caused by a switching operation of switching elements even in a state that an electric motor is equal to or less than a predetermined rotation to suppress a temperature rise of the switching elements, and can generate driving force corresponding to a driver's operation.

Means for Solving the Problems

According to the present invention, there is provided an electric motor control device including: a DC power source which supplies DC power; a power converter which is configured by switching elements and converts DC power from the DC power source into AC power and supplies the power to an electric motor by a switching operation of the switching elements by PWM control; and a control unit which controls driving of the power converter. In the electric motor control device, the control unit includes: a rotational angle processing section which calculates and outputs an electrical angle $\theta$ and a rotational speed Nm of the electric motor; a driving method setting and element loss calculation section which sets a driving method of the power converter by using the electrical angle $\theta$ and the rotational speed Nm from the rotational angle processing section and calculates a loss and a switching loss integrated value of each of the switching elements of the power converter; a carrier frequency selection section which selects a carrier frequency of a carrier signal that is set based on the driving method and the element loss calculated by the driving method setting and element loss calculation section; and a switching signal generation section which generates switching signals that operate the switching elements based on information from the driving method setting and element loss calculation section, the carrier frequency selection section, the rotational angle processing section, and a command voltage and outputs the switching signals to the power converter. Then, when the electric motor is equal to or less than a predetermined rotational speed, the control unit drives the power converter by two-phase modulation drive based on the calculation results of the control unit and calculates losses of a first switching element with a large switching loss and a second switching element; and when the loss integrated value of the first switching element or the second switching element exceeds a predetermined value, the control unit switches the switching signals from the switching signal generation section according to a previously set map to switch the switching operation of the switching elements.

Advantageous Effects of the Invention

According to an electric motor control device of the present invention, there can be obtained an electric motor control device which suppresses cost-up and the generation of a noise, reduces a power loss caused by a switching operation of switching elements even when an electric motor is equal to or less than a predetermined rotational number (for example, an unrotatable or extremely low rotational state) to suppress a temperature rise of the switching elements, and can generate driving force corresponding to a driver's operation.

The foregoing and other objects, features, and advantageous effects of the present invention will become more apparent from detailed description in the following embodiments and description in the accompanying drawings.

BRIEF DESCRIPTION OF THE DRAWINGS

FIG. 11 is a map showing the switching relation between an electrical angle θ and a switching signal during two-phase modulation drive in Embodiment 1 of the present invention;

MODE FOR CARRYING OUT THE INVENTION

Hereinafter, an embodiment of an electric motor control device of the present invention will be described with reference to drawings.

Embodiment 1

Figure 1:
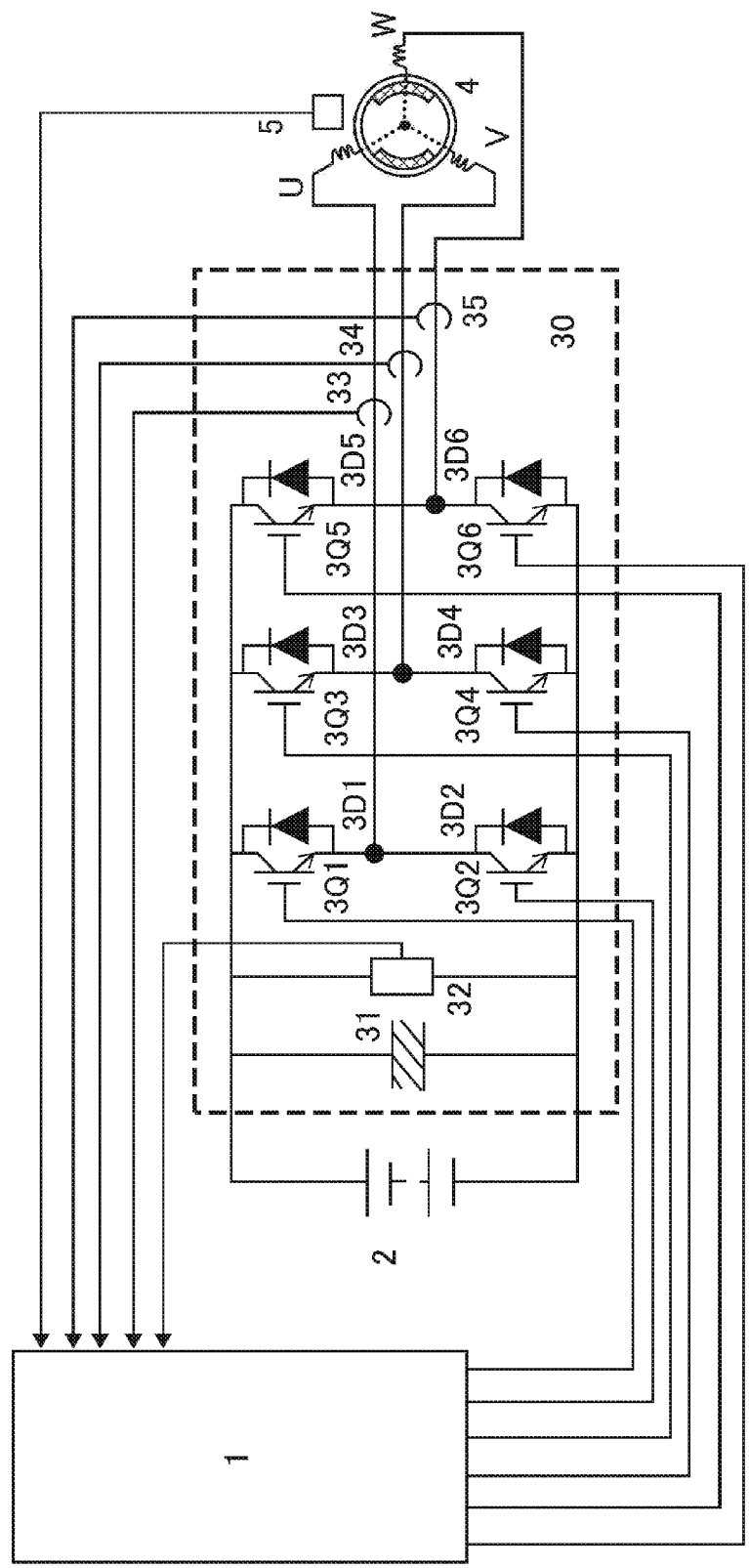
FIG. 1 is a diagram showing the entire configuration of an electric motor control device provided with a power converter in Embodiment 1 of the present invention.

FIG. 1 is a diagram showing the entire configuration of an electric motor control device provided with a power converter in Embodiment 1 of the present invention. In FIG. 1, reference numeral 1 denotes a motor control unit (referred to as an "MCU") which is a control unit that controls a driving method of the power converter and the like according to the present invention; 2, a battery that supplies DC power; 30, a power converter (also referred to as an "inverter") which is provided in parallel with the battery 2 and converts the DC power from the battery 2 into AC power; and 4, an electric motor which generates driving force by the AC power from the inverter 30 to drive rotation. The electric motor 4 is connected to vehicle's wheels (not shown in the drawing) via a power transmission mechanism (not shown in the drawing). Furthermore, 5 denotes a rotational angle sensor that outputs a signal according to the rotation of the electric motor.

The inverter 30 includes a smoothing capacitor 31 that smooths a DC voltage from the battery 2 and a voltage sensor 32 that detects a voltage to be inputted to the inverter 30. Furthermore, as a switching element which operates according to a switching signal from the MCU 1 and converts the DC power from the battery 2 into the AC power to be supplied to the electric motor 4, there are provided a U-phase upper switching element 3Q1, a U-phase lower switching element 3Q2, a V-phase upper switching element 3Q3, a V-phase lower switching element 3Q4, a W-phase upper switching element 3Q5, and a W-phase lower switching element 3Q6.

The switching elements 3Q1, 3Q2, 3Q3, 3Q4, 3Q5, and 3Q6 are connected in reverse parallel with a U-phase upper diode element 3D1, a U-phase lower diode element 3D2, a V-phase upper diode element 3D3, a V-phase lower diode element 3D4, a W-phase upper diode element 3D5, a W-phase lower diode element 3D6, respectively. Furthermore, each one end of three coils of a U-phase, a V-phase, and a W-phase of the electric motor 4 are connected to a neutral point; and each other end is connected to a midpoint of the switching element of each phase.

Next, the details of the specific configuration and function of the MCU 1 will be described with reference to a functional block diagram of FIG. 2.

Figure 2:
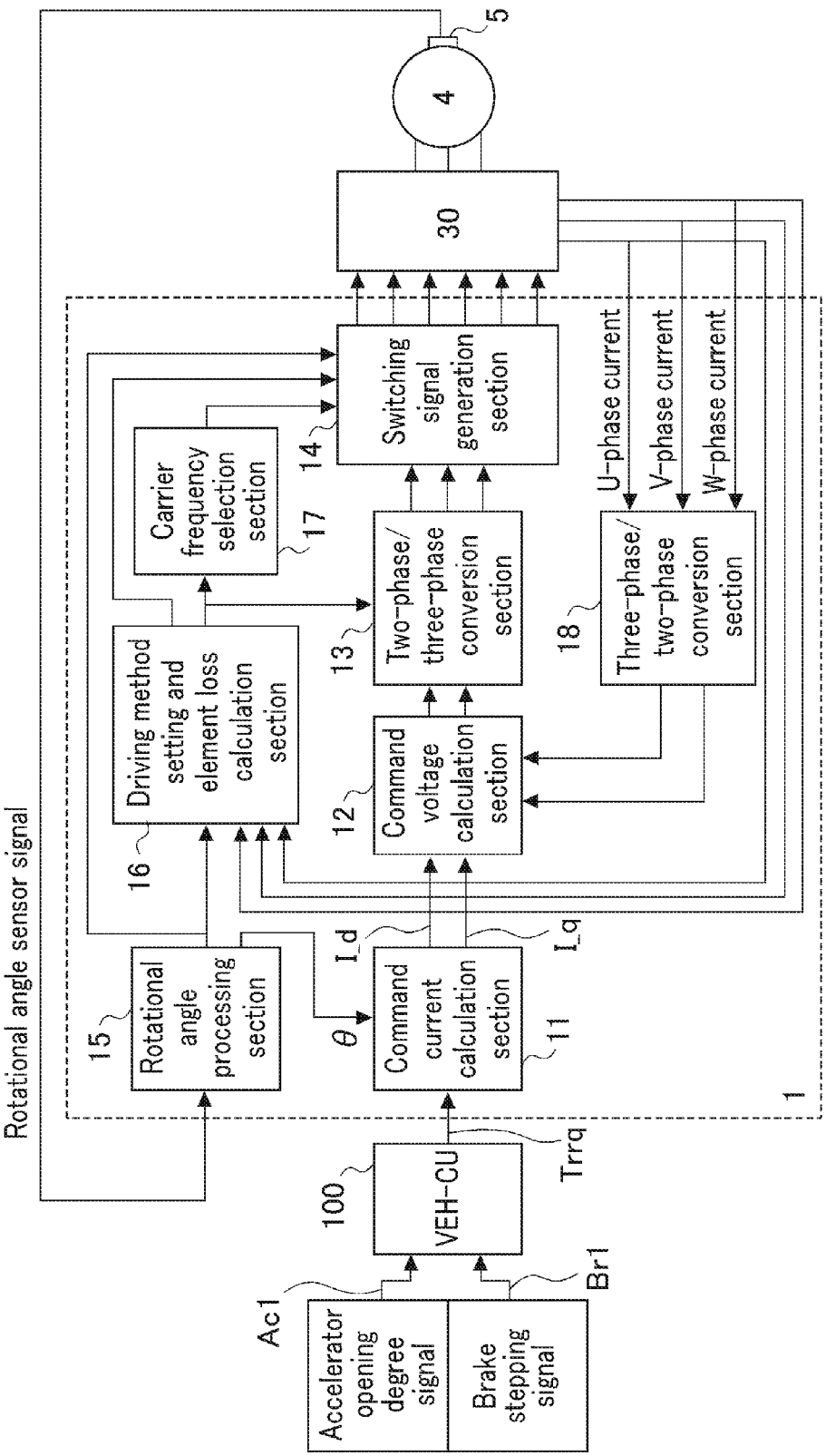
FIG. 2 is a functional block diagram for explaining the configuration and function of a control unit in Embodiment 1 of the present invention.

In FIG. 2, first, an accelerator opening degree signal Ac1 and a brake stepping signal Br1, which show a driver's operation, are inputted to a vehicle control unit (referred to as a "VEH-CU") 100 and command torque Trrq is outputted.

In a command current calculation section 11, command torque Trrq calculated by the VEH-CU 100 and an electrical angle θ outputted from a rotational angle processing section 15 (to be described later) are inputted and a d-axis command current Id and a q-axis command current I_q are outputted by performing d-axis and q-axis conversion.

A command voltage calculation section 12 calculates command voltages by using the d-axis command current I_d, the q-axis command current I_q, and currents in which the output of current sensors 33, 34, and 35 (see FIG. 1) that detect currents flowing in the U-phase, the V-phase, and the W-phase of the electric motor 4 are converted into two phases by a three-phase/two-phase conversion section 18 (to be described later).

A two-phase/three-phase conversion section 13 calculates phase voltages of the U-phase, the V-phase, and the W-phase by inputting the command voltages calculated by the command voltage calculation section 12 and information of a driving method calculated by a driving method setting and element loss calculation section 16 (to be described later).

A switching signal generation section 14 generates a switching signal of each of the switching elements 3Q1 to 3Q6 of the inverter 30 from the phase voltage of each phase calculated by the two-phase/three-phase conversion section 13 and information of a carrier frequency calculated by a carrier frequency selection section 17 (to be described later). The generated switching signals are sent to the inverter 30 and the AC power is supplied to the electric motor 4.

The rotational angle processing section 15 calculates the electrical angle θ and a rotational speed Nm of the electric motor 4 from an output signal of the rotational angle sensor 5 provided in the electric motor 4.

The driving method setting and element loss calculation section 16 determines the driving method of the inverter 30 from the electrical angle θ and the rotational speed Nm from the rotational angle processing section 15. Then, the driving method setting and element loss calculation section 16 calculates a switching loss, a switching loss integrated value, and a normally ON element change flag F1 of a corresponding element of each switching element 3Q1 to 3Q6 of the inverter 30 by using current information from the current sensors 33, 34, and 35 which detect the current flowing in each phase of the electric motor (see FIG. 1). The normally ON element change flag F1 will be described in detail in a description of FIG. 5 (to be described later).

The carrier frequency selection section 17 calculates the carrier frequency based on the driving method set by the driving method setting and element loss calculation section 16.

The three-phase/two-phase conversion section 18 is designed to calculate by converting the output of the current sensors 33, 34, and 35 which detect the current flowing in each phase of the electric motor 4 into two-phase currents and to input the two-phase currents to the command voltage calculation section 12.

Figure 3:
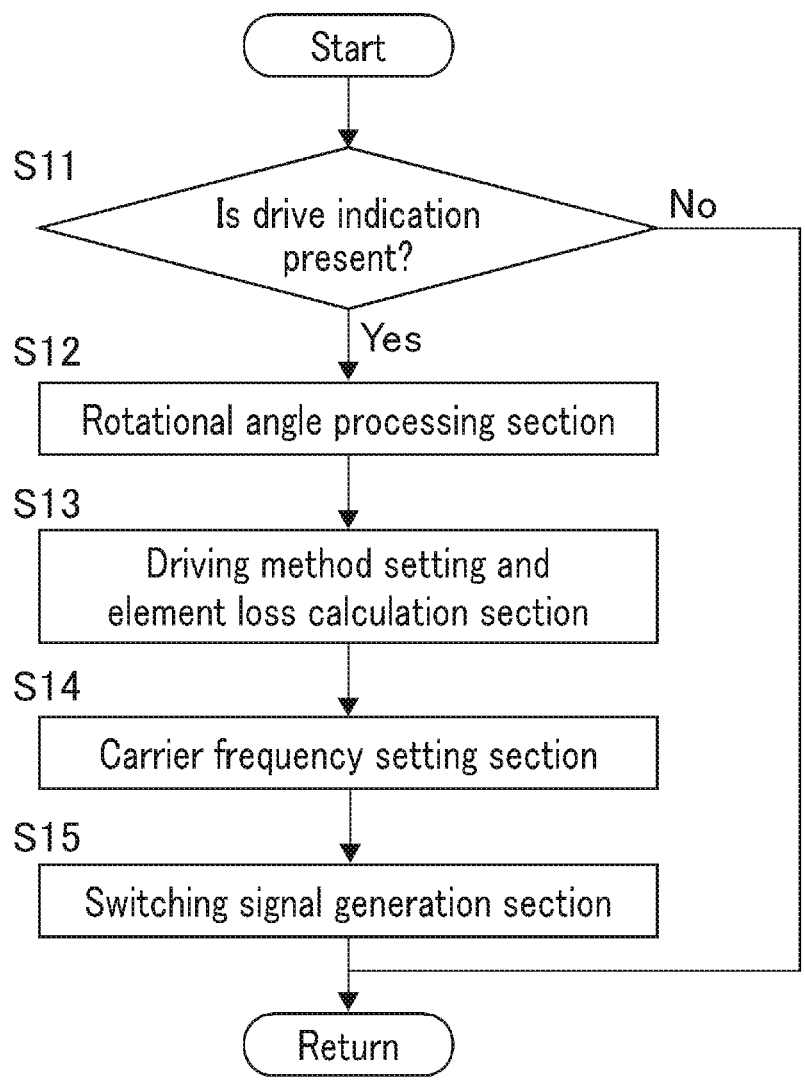
FIG. 3 is a flowchart showing the flow of control and calculation of the entire device in Embodiment 1 of the present invention.

FIG. 3 is a flowchart showing the flow of control and calculation of the entire device in Embodiment 1 of the present invention. In FIG. 3, first, driving of the electric motor 4 is determined in step S11. This determination is a determination of the presence or absence of a drive indication to the electric motor 4; for example, the determination is made based on information resulted from a starting operation such as the amount of stepping of a brake and/or stepping of an accelerator pedal. When a "No" determination is made in step S11, the processing is returned without calculating. When a "Yes" determination is made in step S11, the processing proceeds to step S12 and the rotational angle processing section 15 is executed. The details of the rotational angle processing section 15 will be described by FIG. 4 (to be described later). Next, when the processing proceeds to step S13, the driving method setting and element loss calculation section 16 is executed. The details of the driving method setting and element loss calculation section 16 will be described by FIG. 5 (to be described later). Next, when the processing proceeds to step S14, the carrier frequency setting section 17 is executed; and this will be described in detail by FIG. 8. Then, the switching signal generation section 14 is executed in step S15. The switching signal generation section 14 will be described in detail by FIG. 10.

Next, the aforementioned rotational angle processing section 15, driving method setting and element loss calculation section 16, carrier frequency selection section 17, and switching signal generation section 14 will be described by using FIG. 4 to FIG. 11.

Figure 4:
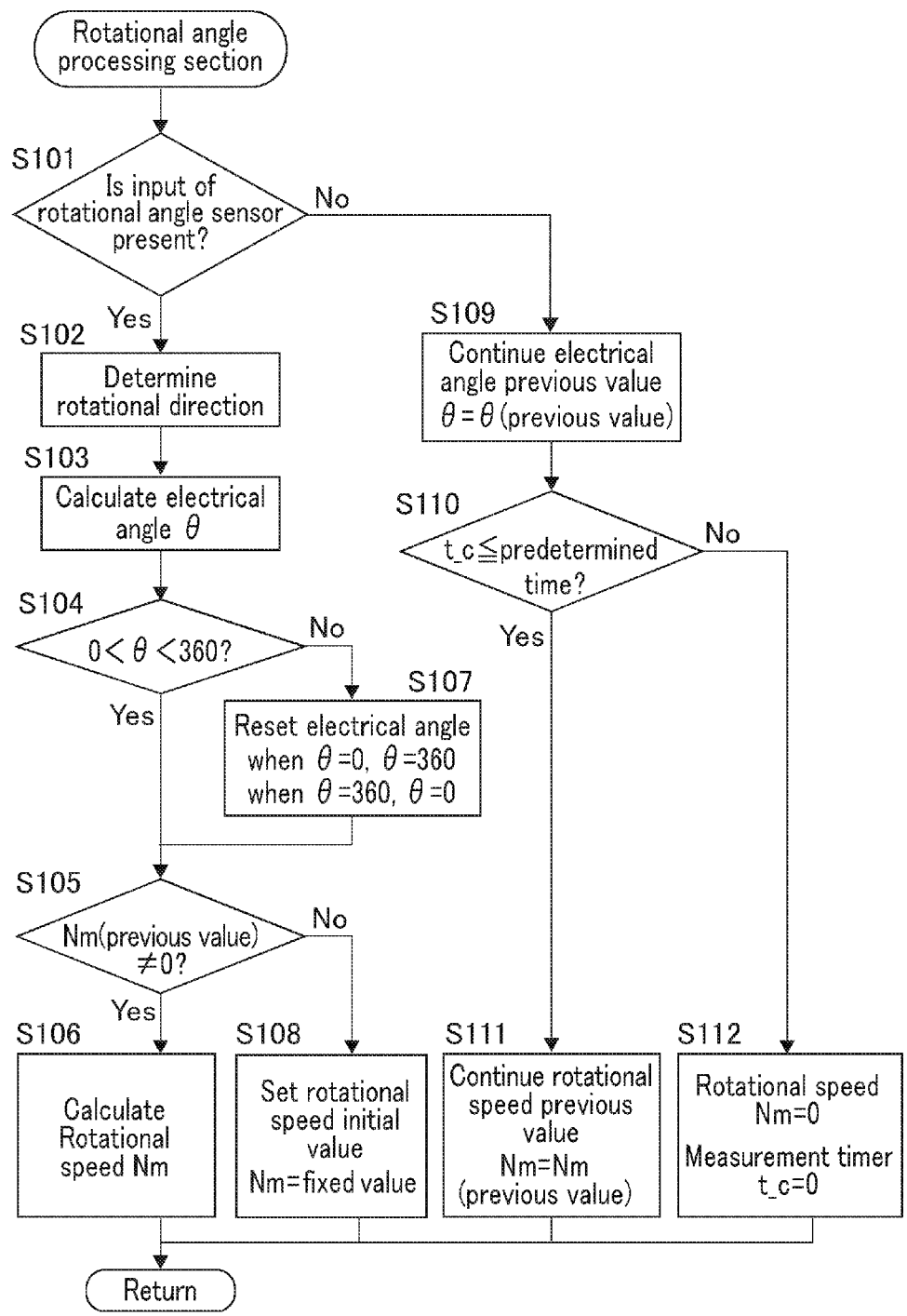
FIG. 4 is a flowchart showing the flow of calculation of processing executed by a rotational angle processing section 15 in Embodiment 1 of the present invention.

FIG. 4 is a flowchart showing the flow of calculation of the rotational angle processing section 15 to be executed in step S12 of FIG. 3. In FIG. 4, first, the propriety of the input from the rotational angle sensor 5 is determined in step S101. When the input from the rotational angle sensor 5 is present, a "Yes" determination is made in step S101 and the processing proceeds to step S102; and when the input is absent, the processing proceeds to S109. When the processing proceeds to step S102, next, the rotational direction of the electric motor 4 is determined. This determination is determined based on, for example, information of a shift position and/or an acceleration sensor of the vehicle (not shown in the drawing). When the determination of the rotational direction of the electric motor 4 is finished in step S102, the processing proceeds to step S103 and the electrical angle θ is calculated according to the determination results of the rotational direction in step S102. In the calculation of the electrical angle θ, a predetermined value (for example, 0.5 degrees) is added for each input of the rotational angle sensor when the determination of step S102 is a positive rotation; and when the determination of step S102 is a negative rotation, the predetermined value is subtracted for each input of the rotational angle sensor 5.

Then, when the processing proceeds to step S104, a determination of the calculated electrical angle θ is made. First, a determination is made whether or not the electrical angle θ is in the range of a rotational angle in step S104. The rotational angle is 360 degrees for one cycle and if the electrical angle θ calculated in step S103 is in the range from 0 (zero) to 360 degrees, a "Yes" determination is made in step S104 and the processing proceeds to step S105; and if the electrical angle θ is 0 (zero) or 360 degrees, the processing proceeds to step S107. If the processing proceeds to step S107, and when the electrical angle θ is 0 (zero) degrees, θ is reset to 360 degrees; and when the electrical angle θ is 360 degrees, θ is reset to 0 (zero) degrees and the processing proceeds to step S105.

When the processing proceeds to step S105, next, a determination of the rotational speed Nm of the electric motor 4 is made. First, a determination of a previous value of the rotational speed Nm is made in step S105. When the determination of step S105 is a "Yes" determination, the processing proceeds to step S106 and the rotational speed Nm is calculated; and the processing is returned. On the other hand, when a "No" determination is made in step S105, the processing proceeds to step S108 and the rotational speed Nm is set to a predetermined fixed value; and the processing is returned. The predetermined fixed value is set to a minute value (for example, ±0.1 rpm) that is not 0 (zero) according to the rotational direction determined in step S102.

Next, when a "No" determination is made in step S101 and the processing proceeds to step S109, the electrical angle θ is held at a previous value because the input of the rotational angle sensor is absent; and the processing proceeds to step S110. When the processing proceeds to step S110, next, a determination of a measurement timer t_c is made. The measurement timer is a timer which measures an input interval of the rotational angle sensor 5 and measures the input interval of the rotational angle sensor 5 by using a previous input time of the rotational angle sensor 5 when the input of the rotational angle sensor 5 is present. Furthermore, a predetermined time used for the determination of step S110 is set to a time (for example, 200 msec) capable of determining a rotational stop of the electric motor 4. When a "Yes" determination is made in step S110, although the input of the rotational angle sensor 5 is absent, it is not possible to determine that the rotation of the electric motor 4 is stopped. Therefore, the processing proceeds to step S111 and the rotational speed Nm is held at the previous value, and the processing is returned.

On the other hand, when a "No" determination is made in step S110, the input of the rotational angle sensor 5 is absent and the rotation of the electric motor 4 is stopped. Therefore, the processing proceeds to step S112, the rotational speed Nm is set to 0 (zero), the measurement timer t_c is set to 0 (zero), and the processing is returned.

Figure 5:
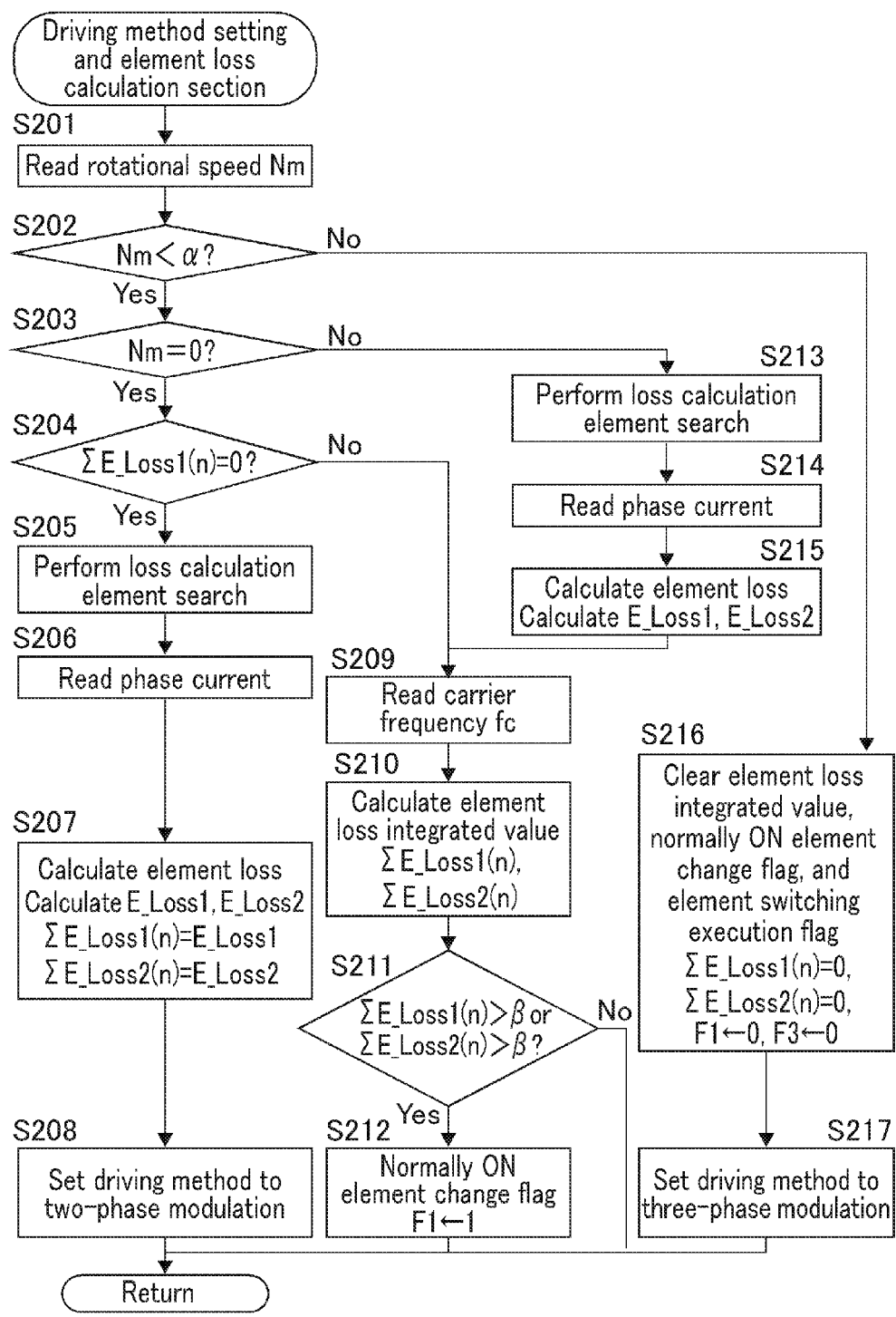
FIG. 5 is a flowchart showing the flow of calculation of processing executed by a driving method setting and element loss calculation section in Embodiment 1 of the present invention.
Figure 6:
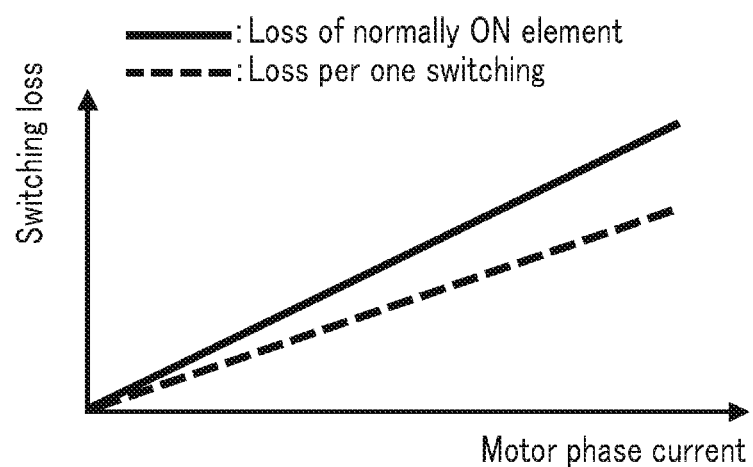
FIG. 6 is a view showing the relation between a loss of a switching element and a motor phase current of an electric motor.

FIG. 5 is a flowchart showing the flow of the driving method setting and element loss calculation section 16 to be executed in step S13 of FIG. 3.

In FIG. 5, in the driving method setting and element loss calculation section 16, the rotational speed Nm is first read in step S201, and the processing proceeds to step S202 to compare it with a predetermined value α. The predetermined value α is set to a rotational speed at which two-phase modulation drive is not needed, for example, 50 rpm. When a "No" determination is made in step S202, the processing proceeds to step S216 and an integrated power loss (ΣE_Loss1, ΣE_Loss2), a normally ON element change flag F1, and a switching execution flag F3 (which are to be described later) are cleared. Then, the processing proceeds to step S217, the driving method is set to three-phase modulation, and the processing is returned.

On the other hand, when a "Yes" determination is made in step S202, the processing proceeds to step S203, and a determination is made whether or not the rotational speed Nm is zero. When a "Yes" determination is made in step S203, the processing proceeds to step S204; and next, a determination of an element loss integrated value is made.

When a "Yes" determination is made in step S204, a first loss calculation is performed; and therefore, the processing proceeds to step S205 and a loss calculation element search is performed. The loss calculation element search to be executed in step S205 will be described in detail by FIG. 7 (to be described later) and therefore its description is omitted here. When the processing proceeds to step S206, current values flowing in each phase of the electric motor 4 (hereinafter, referred to as a "motor phase current") are read, the current values being to be detected by the current sensors 33, 34, and 35; and the processing proceeds to step S207.

When the processing proceeds to step S207, losses of the element searched in step S205 and each element are calculated based on the phase current values read in step S206. The loss of the switching element for use in the inverter 30 can be calculated from the motor phase current and, for example, there is a relation shown in FIG. 6. Therefore, if the switching element in which a large current flows can be specified, the switching loss can be calculated.

In step S207, there is performed a calculation of a first switching loss E_Loss1, that is, a loss of a switching element with a large loss, which becomes normally ON; and a second switching loss E_Loss2, that is, a loss of an element with the largest loss in the elements which performs a switching operation. Then, the processing proceeds to step S208, the driving method is set to two-phase modulation, and the processing is returned.

Next, when a "No" determination is made in step S203, the electric motor 4 is in an extremely low rotational state; and therefore, the processing proceeds to step S213 and a loss calculation element search is performed. The loss calculation element search will be described later. When the processing proceeds to step S214, a motor phase current is read as with S206; the first switching loss E_Loss1 and the second switching loss E_Loss2 are calculated by using the relation of FIG. 6 in step S215; and the processing proceeds to step S209.

When a "No" determination is made in step S204, that is, when the first element loss has been calculated, or after the calculation of step S215 is finished, the processing proceeds to step S209 and a set carrier frequency fc is read. Setting of the carrier frequency fc will be described by FIG. 8 and therefore its description is omitted here.

When the carrier frequency fc is read in step S209, the processing proceeds to step S210 and integrated values of the first switching loss E_Loss1 and the second switching loss E_Loss2 are calculated.

Since the first switching loss integrated value $\Sigma E\_Loss1$ is a loss of a normally ON element, the integrated value $\Sigma E\_Loss1$ is calculated by a current conduction time of the first switching loss E_Loss1 calculated in step S207; and the integrated value $\Sigma E\_Loss1$ is calculated by using a control cycle (for example, 10 μsec) of the flowchart of FIG. 5 as the current conduction time. Its calculation equation is as follows.

$$\Sigma E\_Loss1(n)=\Sigma E\_Loss1(n-1)+(E\_Loss1 \times \text{control cycle}) \quad \text{(Equation 1)}$$

Since the second switching loss integrated value $\Sigma E\_Loss2$ is a value during the switching operation, the number of switching between the control cycles needs to be calculated. Then, the number of switching can be calculated from the control cycle and the carrier frequency fc; and therefore, the second switching loss integrated value $\Sigma E\_Loss2$ can be calculated from the following equation.

$$\Sigma E\_Loss2(n)=\Sigma E\_Loss2(n-1)+(E\_Loss2 \times (\text{control cycle/carrier frequency } fc)) \quad \text{(Equation 2)}$$

Furthermore, while an element switching determination F2 (to be described later) is not established, calculation of the first and the second switching loss integrated values are as follows.

$$\Sigma E\_Loss1(n)=\Sigma E\_Loss1(n-1)-(E\_Loss1 \times \text{control cycle}-(E\_Loss1 \times (\text{control cycle/carrier frequency } fc)) \quad \text{(Equation 3)}$$

$$\Sigma E\_Loss2(n)=\Sigma E\_Loss2(n-1)+(E\_Loss2 \times \text{control cycle}) \quad \text{(Equation 4)}$$

Furthermore, while the element switching determination F2 is established, the first and the second switching loss integrated values are calculated by the following equation.

$$\Sigma E\_Loss1(n)=\Sigma E\_Loss1(n-1)+(E\_Loss1\times\text{control cycle}) \quad \text{(Equation 5)}$$

$$\Sigma E\_Loss2(n)=\Sigma E\_Loss2(n-1)-(E\_Loss2\times\text{control cycle}-(E\_Loss2\times(\text{control cycle/carrier frequency }fc)) \quad \text{(Equation 6)}$$

When the first switching element loss integrated value ΣE_Loss1 and the second switching element loss integrated value ΣE_Loss2 are calculated in step S210, the processing proceeds to step S211 and a determination is made whether either of the calculated loss integrated values is larger than a predetermined value β. The predetermined value β is set based on a current flowing in maximum torque of the electric motor 4.

When a "Yes" determination is made in step S211, the processing proceeds to step S212, the normally ON element change flag F1 is set to 1, and the processing is returned; and when a "No" determination is made, the loss integrated value has not reached the predetermined value β yet and therefore the processing is returned.

Figure 7:
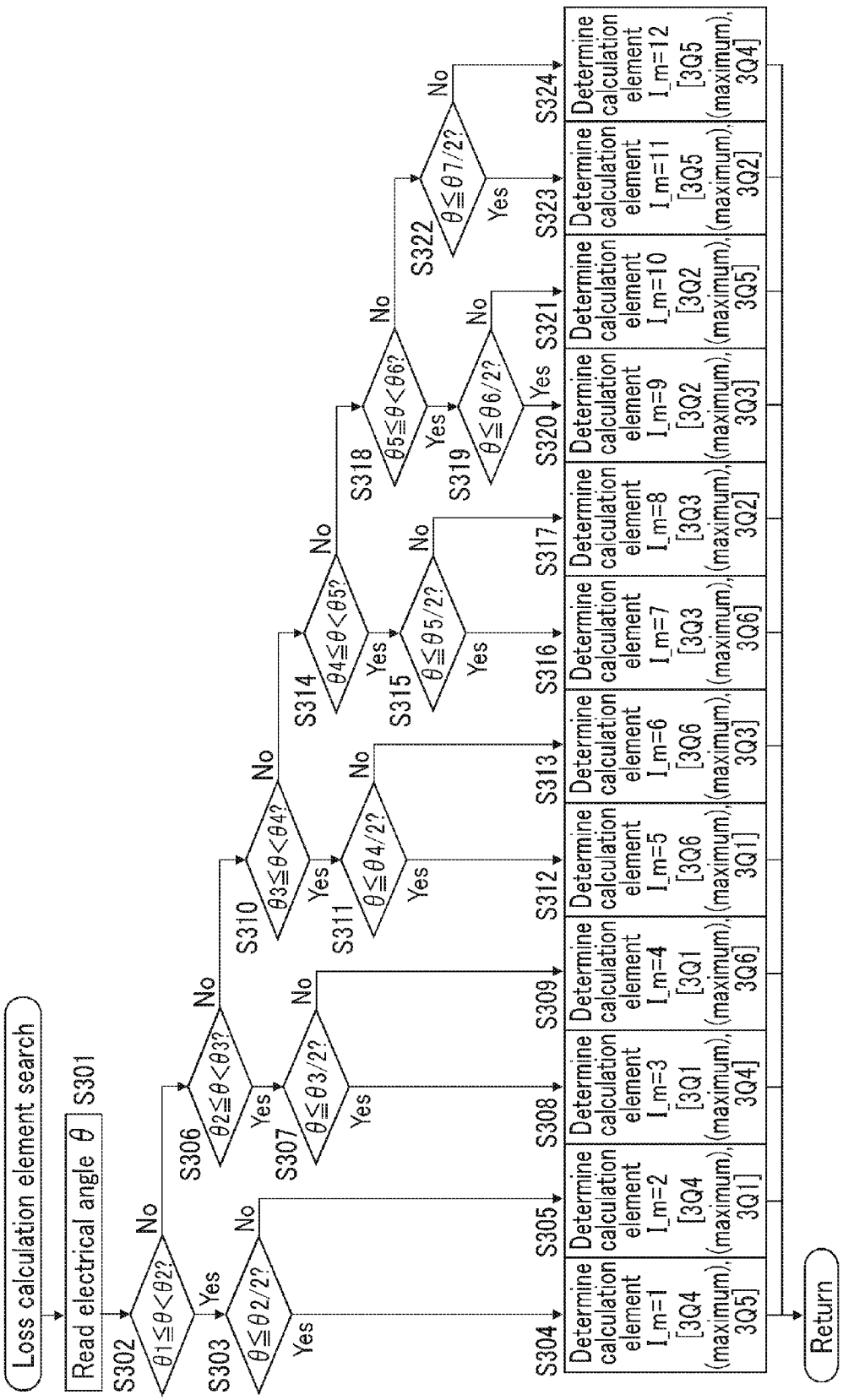
FIG. 7 is a flowchart showing the flow of calculation of processing executed by a loss calculation element search of step S205 of FIG. 5.

FIG. 7 is a flowchart showing the flow of calculation of processing to be executed in the loss calculation element search of S205 of FIG. 5.

In FIG. 7, first, the electrical angle θ is read in step S301; the processing proceeds to step S302. Then, when the electrical angle θ is in the range of θ1 to θ2 in step S302, a "Yes" determination is made and the processing proceeds to step S303; and when a "No" determination is made, the processing proceeds to step S306.

When the processing proceeds to step S303, next, a determination is made whether or not the electrical angle θ is equal to or less than θ2/2; and when a "Yes" determination is made in step S303, the processing proceeds to step S304, the switching elements 3Q4 and 3Q5 are determined as loss calculation elements and calculation element information I_m is set to 1. When a "No" determination is made in step S303, the processing proceeds to step S305, the switching element 3Q4 and 3Q1 are determined as the loss calculation elements, the calculation element information I_m is set to 2, and the processing is returned.

Here, θ1 to θ7 for use in the determination of the electrical angle range are set according to one cycle of the electrical angle (360 degrees); and setting is made from a start of θ1=0 degrees to θ6 at 60 degrees of pitch and is set to θ7=359 degrees.

When a "No" determination is made in step S302, the processing proceeds to step S306; and then, a determination is made whether the electrical angle θ is in the range from θ2 to θ3. When a "No" determination is made, the processing proceeds to S301; when a "Yes" determination is made, the processing proceeds to step S307; and when the processing proceeds to step S307, a determination is made whether the electrical angle θ is equal to or less than θ3/2. When a "Yes" determination is made in step S307, the processing proceeds to step S308, the calculation element information I_m is set to 3 and the calculation elements are determined as 3Q1 and 3Q4. When a "No" determination is made in step S307 and the processing proceeds to step S309, the calculation element information I_m is set to 4, the calculation elements are determined as 3Q1 and 3Q6, and the processing is returned.

Hereinafter, the calculation element information I_m is sequentially updated according to the electrical angle θ and the calculation element is determined.

Figure 8:
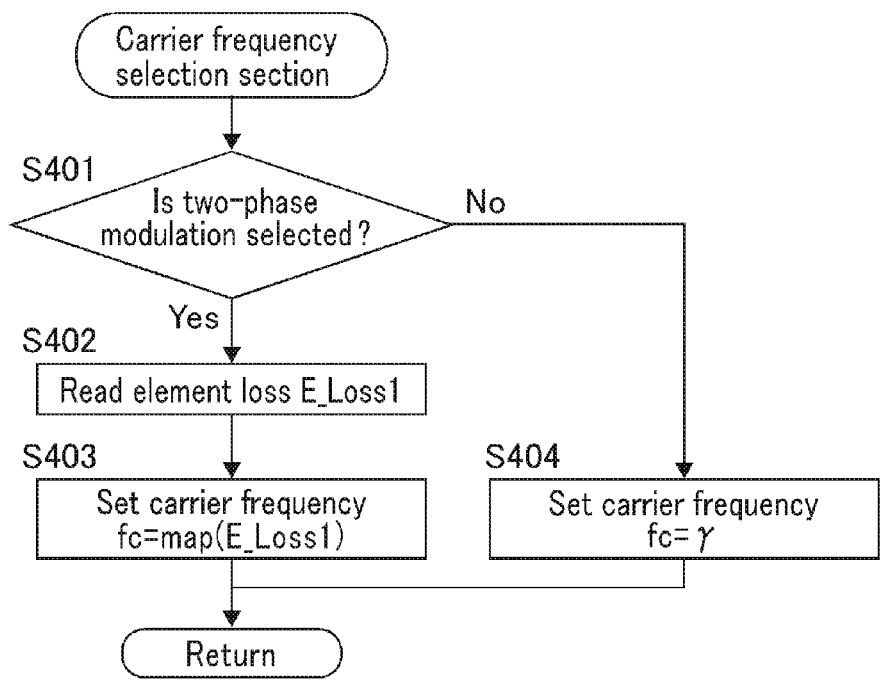
FIG. 8 is a flowchart showing the flow of calculation of processing executed by a carrier frequency selection section in Embodiment 1 of the present invention.
Figure 9:
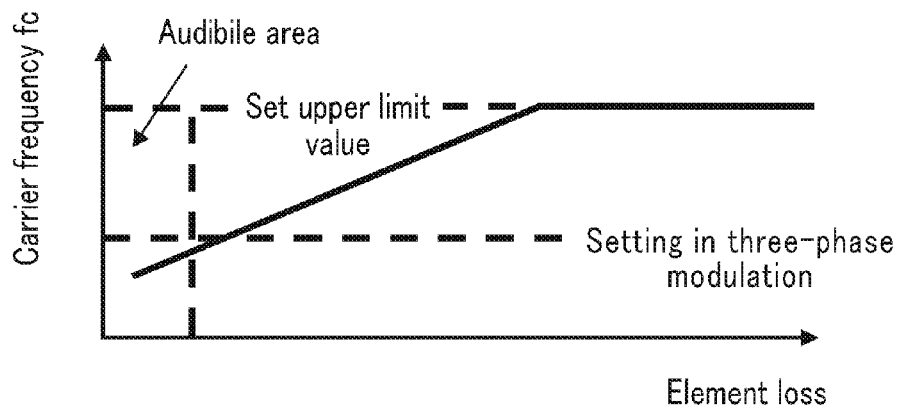
FIG. 9 is a view showing an example of the relation between the element loss and a carrier frequency in Embodiment 1 of the present invention.

FIG. 8 is a flowchart showing the flow of calculation of the carrier frequency selection section 17 to be executed in S14 of FIG. 3.

In FIG. 8, in the carrier frequency selection section 17, first, a determination of the driving method (see FIG. 5) is made in step S401. When the two-phase modulation is set in step S401, a "Yes" determination is made and the processing proceeds to step S402; and when a "No" determination is made, that is, when the three-phase modulation is set, the processing proceeds to step S404, the carrier frequency fc is set to a predetermined value γ, and the processing is returned.

Here, the predetermined value γ is the carrier frequency fc during the normal three-phase modulation drive and is previously calculated by experiments and the like, for example, the predetermined value γ is set to 7 kHz.

When the processing proceeds to step S402, the element loss E_Loss1 is read and the processing proceeds to step S403. When the processing proceeds to step S403, the carrier frequency fc is set from the relation between the element loss and the carrier frequency fc. The relation between the element loss and the carrier frequency fc becomes a relation shown in FIG. 9, the carrier frequency fc corresponding to the element loss E_Loss1 is set, and the processing is returned.

Figure 10:
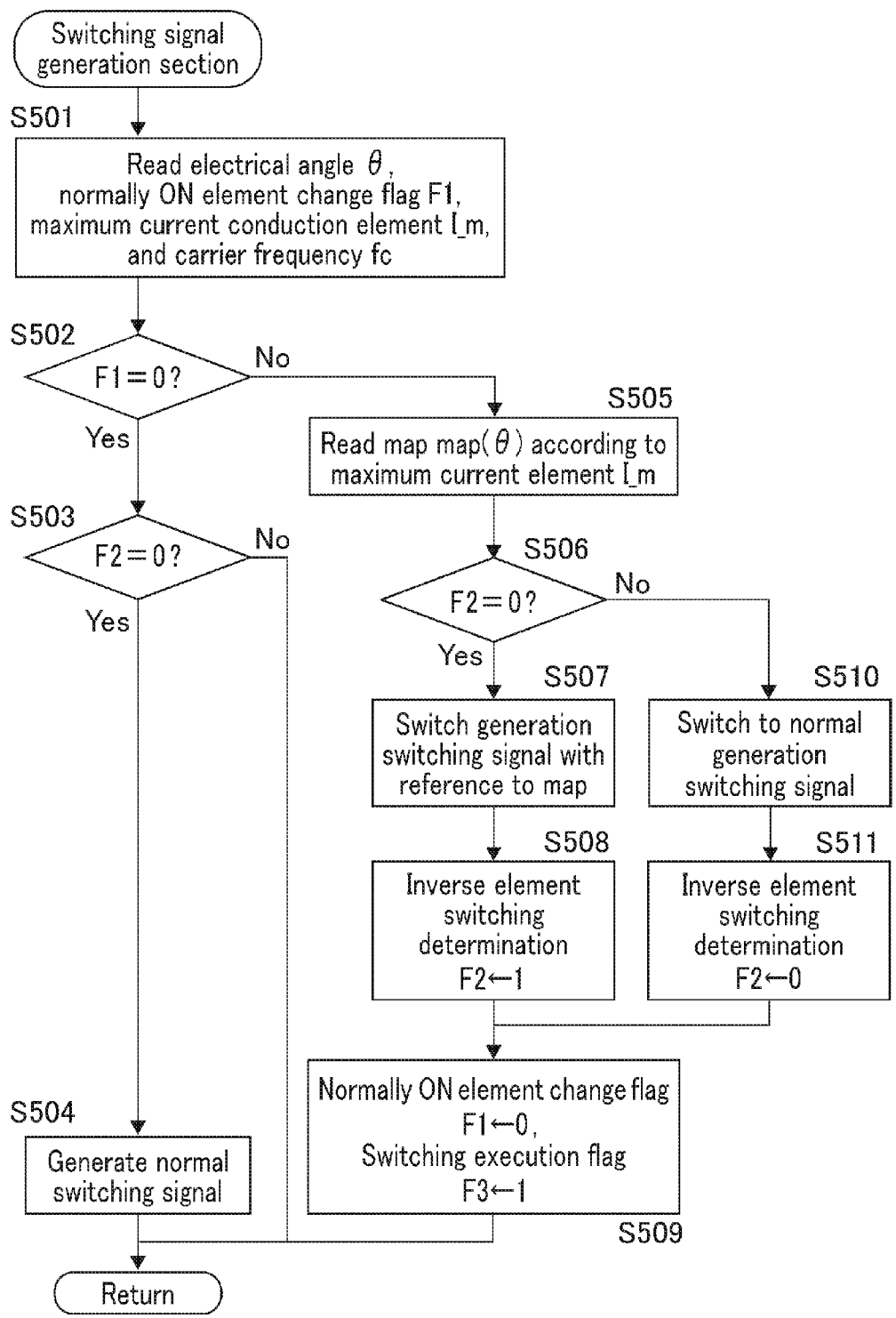
FIG. 10 is a flowchart showing the flow of calculation of processing executed by a switching signal generation section in Embodiment 1 of the present invention.

FIG. 10 is a flowchart showing the flow of calculation of the switching signal generation section 14 to be executed in FIG. 3.

In FIG. 10, in the switching signal generation section 14, first, the electrical angle θ, the normally ON element change flag F1, the calculation element information I_m, and the carrier frequency fc are read in step S501 and the processing proceeds to step S502. When the processing proceeds to step S502, a determination of the normally ON element change flag F1 is made. When the normally ON element change flag F1 is zero in step S502, a "Yes" determination is made and the processing proceeds to S503; and when the normally ON element change flag F1 is 1, a "No" determination is made and the processing proceeds to step S505.

In step S502, when the normally ON element change flag F1 is not established (F1=0) regardless that the driving method is the three-phase modulation or the two-phase modulation, the processing proceeds to step S503 and then a determination of the element switching determination F2 is made.

The element switching determination F2 is determination to be set in step S508 or S511 (to be described later); and when the normally ON element change flag F1 is not established (F1=0), the element switching determination F2 is not made. When a "Yes" determination is made in step S503, the processing proceeds to step S504, a switching signal corresponding to the selected driving method is generated and the processing is returned.

On the other hand, when a "No" determination is made in step S503, a generation switching signal (to be described later) is switched; and the generation switching signal is not changed and thus the processing is returned.

When a "No" determination is made in step S502 and the processing proceeds to step S505, a map data map(θ) is read according to the calculation element information I_m. The map data is used for a switching signal change to be set in step S507 (to be described later) and setting is made by mapping a relation like FIG. 11 according to the electrical angle θ.

Next, when the processing proceeds to step S506, a determination of the element switching determination F2 is made. When a "Yes" determination is made in step S506, the processing proceeds to step S507, and the generation switching signal is switched with reference to the map map(θ) read in step S505. Then, the processing proceeds to step S508, the element switching determination F2 is set to 1, and the processing proceeds to step S509. On the other hand, when a "No" determination is made in step S506, the normally ON element change flag F1 is established (F1=0) and the generation switching signal has been switched; and therefore, the processing proceeds to step S510 and switching is made to a normal switching signal. Then, the processing proceeds to step S511, the element switching determination F2 is set to zero in step S511, and the processing proceeds to step S509.

When the processing proceeds to step S509, the switching signal is changed in step S507 and step S510; and therefore, the normally ON element change flag F1 is set to zero and the processing is returned.

FIG. 11 shows an example in which the relation between the electrical angle θ and the switching signal switch during the two-phase modulation drive is mapped and shows an example of switching of the switching signal when the element loss integrated value (ΣE_Loss1, ΣE_Loss2) exceeds the predetermined value β during the two-phase modulation drive.

Figure 12:
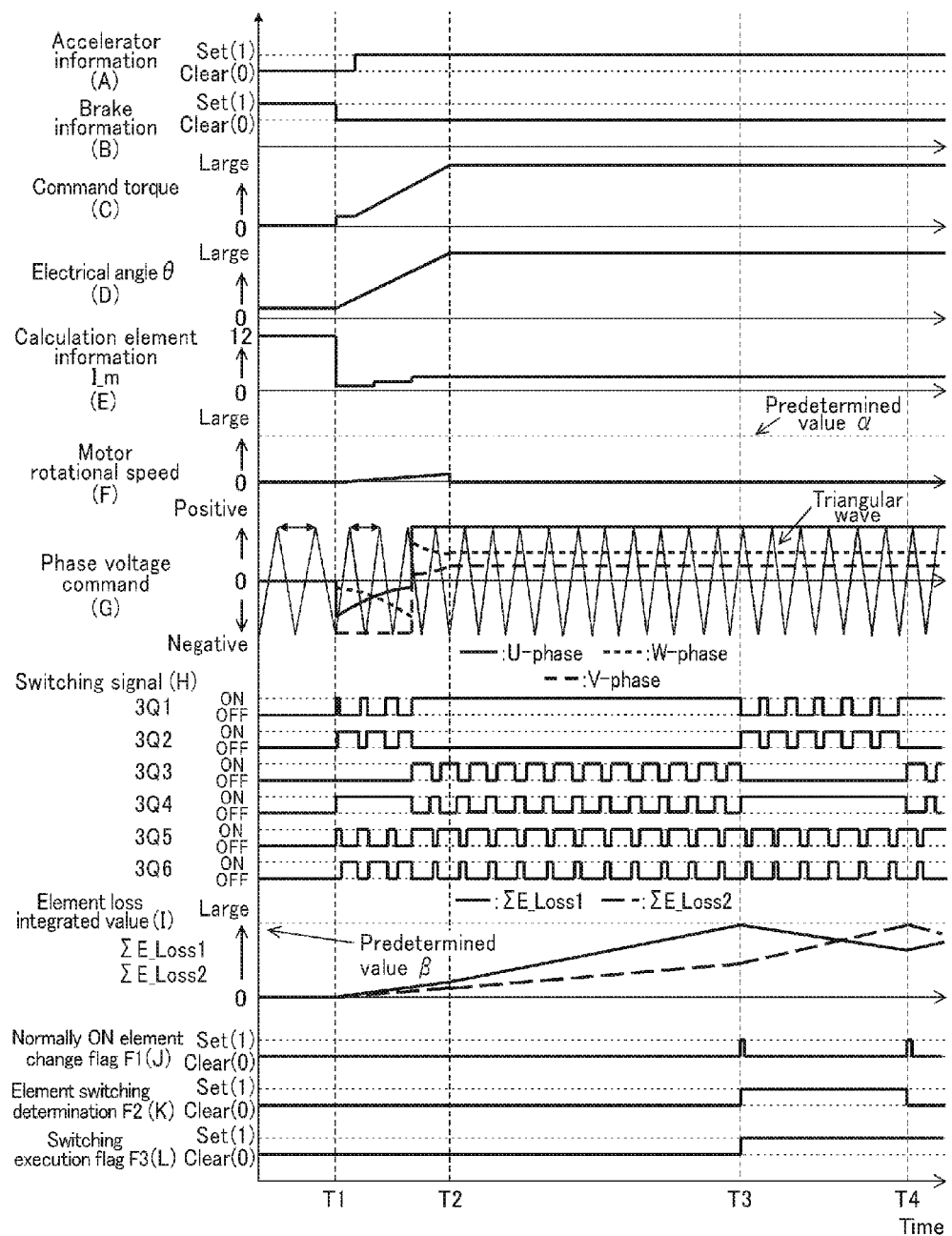
FIG. 12 is a timing chart showing operation waveforms of respective portions in the electric motor control device of Embodiment 1 of the present invention.
Figure 13:
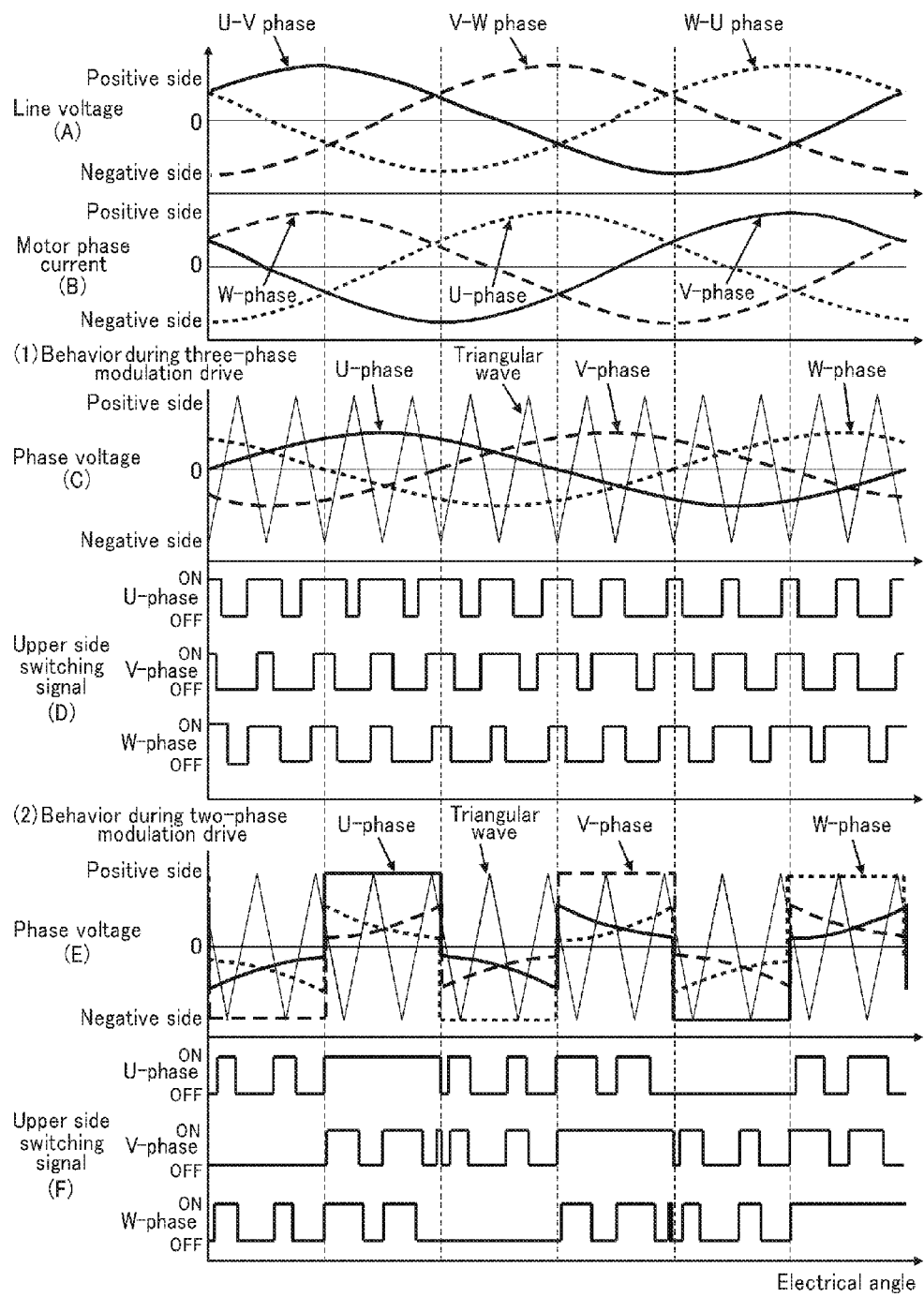
FIG. 13 is a chart showing the relation between a phase voltage command and a switching signal during general three-phase modulation drive and two-phase modulation drive.

FIG. 12 is a timing chart showing operation waveforms of respective portions in the thus configured electric motor control device of Embodiment 1 of the present invention. In FIG. 12, when brake information (B) is cleared at time T1, that is, when the driver releases a brake, the beginning of the starting operation is determined; command torque (C) becomes a predetermined creep torque value; and next, calculation element information I_m (E) is updated according to an electrical angle θ (D). A motor rotational speed (F) cannot be calculated unless the electrical angle θ (D) is updated two times or more; and therefore, the driving method by the two-phase modulation00 is selected just after the command torque (C) is outputted and each phase voltage command (G) of a U-phase, a V-phase, and a W-phase is outputted according to the electrical angle θ (D). Furthermore, since the driving method by the two-phase modulation is selected, the carrier frequency fc is set to a high frequency, each switching signal (H) is generated in comparison with the phase voltage command of each phase (G), each switching element 3Q1 to 3Q6 starts the switching operation, and driving force is generated in the electric motor 4.

Then, the motor rotational speed (F) of the electric motor 4 is lower than the predetermined value α and an element loss integrated value (I) is zero; and therefore, the corresponding element switching loss (E_Loss1, E_Loss2) is calculated according to the calculation element information and calculation of the element loss integrated value (I) is started. At this time T1, each of the normally ON element change flag F1 and the element switching determination F2 is an unestablished state (F1=0, F2=0).

Next, until time T2, the electric motor 4 is driven at the motor rotational speed (F) lower than the predetermined value α; and therefore, the element loss is sequentially calculated according to the electrical angle θ(D) and the element loss integrated value (I) (ΣE_Loss1, ΣE_Loss2) increases.

At time T2, the update of the electrical angle θ(D) is stopped, that is, the electric motor 4 becomes an unrotatable state; and therefore, the calculation element information I_m (E) becomes a constant value and the motor rotational speed (F) becomes zero. However, the calculation of the element loss integrated value (I) is continued.

Then, at time T3, the first element loss integrated value ΣE_Loss1 of the element loss integrated value (I) exceeds the predetermined value β; and therefore, the normally ON element change flag F1(J) is set to 1 and the switching signal (H) to each switching element 3Q1 to 3Q6 is switched by using the relation between the electrical angle θ (D) and FIG. 11.

Then, when the switching signal (H) is switched, the element switching determination F2 is set to 1, the switching execution flag F3 is set to 1 and the element switching is performed; and therefore, the normally ON element change flag F1 is reset to zero. When the switching signal (H) is switched, the element loss integrated value (ΣE_Loss1) gradually decreases, whereas the element loss integrated value (ΣE_Loss2) increases.

Then, at time T4, next, the element loss integrated value (ΣE_Loss2) exceeds the predetermined value β; and therefore, the normally ON element change flag F1 is set to 1 again. Then, next, the switching signal (H) of each switching element 3Q1 to 3Q6 is switched to the switching signal (H) of the two-phase modulation drive during normal time. When switching of the switching operation of the switching elements 3Q1 to 3Q6 is finished, the element switching determination F2 is set to zero and the normally ON element change flag F1 is reset to zero.

As described above, according to the electric motor control device of Embodiment 1 of the present invention, in the electric motor control device including the power converter and the control unit thereof, in which the driving method of the electric motor is driven so as to select one of the two-phase modulation drive and the three-phase modulation drive according to the operation (rotation) state of the electric motor; when the electric motor is equal to or less than the predetermined rotational speed, the control unit drives the power converter by the two-phase modulation drive based on the calculation results of the driving method setting and element loss calculation section and calculates losses of the first switching element with a large switching loss and the second switching element of the power converter; and when the loss integrated value of the first switching element or the second switching element exceeds a predetermined value, the control unit switches the switching signals from the switching signal generation section according to the previously set map to switch the switching operation of the switching elements. Therefore, there can be obtained the following excellent effects.

There can be obtained the electric motor control device in which (1) the temperature sensor which is for detecting the temperature of the power converter is not needed and cost-up can be suppressed; and (2) when the loss integrated value of the switching elements during the two-phase modulation drive in an unrotatable or extremely low rotational state of the electric motor exceeds the predetermined value, a temperature rise of the switching elements can be suppressed by switching the switching operation of the switching elements, whereby a deterioration of supply power to the electric motor due to the temperature rise of the switching elements can be suppressed and driving force corresponding to a driver's operation can be generated.

INDUSTRIAL APPLICABILITY

The present invention is useful as an electric motor control device to be mounted on an electric vehicle such as a hybrid vehicle and an electric car.

DESCRIPTION OF REFERENCE NUMERALS

1 Motor control unit (MCU),
2 Battery,

4 Electric motor,
5 Rotational angle sensor,
11 Command current calculation section,
12 Command voltage calculation section,
13 Two-phase/three-phase conversion section,
14 Switching signal generation section,
15 Rotational angle processing section,
16 Driving method setting and element loss calculation section,
17 Carrier frequency selection section,
18 Three-phase/two-phase conversion section,
30 Power converter,
31 Smoothing capacitor,
32 Voltage sensor,
33, 34, and 35 Current sensor,
3Q1 to 3Q6 Switching element, and
100 vehicle control unit.

The invention claimed is:

1. An electric motor control device comprising:
a DC power source which supplies DC power;
a power converter which is configured by switching elements and converts DC power from said DC power source into AC power and supplies the power to an electric motor by a switching operation of said switching elements by PWM control; and
a control unit which controls driving of said power converter, wherein said control unit includes:
a rotational angle processor configured to calculates and outputs an electrical angle θ and a rotational speed Nm of said electric motor;
a driving method setting and element loss calculation processor configured to sets a driving method of said power converter by using the electrical angle θ and the rotational speed Nm from said rotational angle processor and calculates a loss and a switching loss integrated value of each of said switching elements of said power converter;
a carrier frequency selector configured to selects a carrier frequency of a carrier signal that is set based on the driving method and the element loss calculated by said driving method setting and element loss calculation processor; and
a switching signal generator configured to generates switching signals that operate said switching elements based on information from said driving method setting and element loss calculation processor, said carrier frequency selector, said rotational angle processor, and a command voltage and outputs the switching signals to said power converter, and
wherein, when said electric motor is equal to or less than a predetermined rotational speed, said control unit drives said power converter by two-phase modulation drive based on the calculation results of said control unit and calculates losses of a first switching element with a large switching loss and a second switching element; and
when the loss integrated value of said first switching element or said second switching element exceeds a predetermined value, said control unit switches the switching signals from said switching signal generator according to a previously set map to switch the switching operation of said switching elements.

2. The electric motor control device according to claim 1, wherein the predetermined value of the loss integrated value is set based on a current that flows at maximum torque.

3. The electric motor control device according to claim 1, wherein the carrier frequency during the two-phase modulation drive is set based on the loss of said first switching element.

* * * * *